(12) United States Patent
Ko et al.

(10) Patent No.: US 8,614,984 B2
(45) Date of Patent: Dec. 24, 2013

(54) METHOD AND DEVICE FOR EFFICIENTLY TRANSMITTING PRECODED REFERENCE SIGNAL IN RADIO COMMUNICATION SYSTEM

(75) Inventors: Hyun Soo Ko, Anyang-si (KR); Moon Il Lee, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 13/375,209

(22) PCT Filed: May 31, 2010

(86) PCT No.: PCT/KR2010/003458
§ 371 (c)(1),
(2), (4) Date: Jan. 18, 2012

(87) PCT Pub. No.: WO2010/137925
PCT Pub. Date: Dec. 2, 2010

(65) Prior Publication Data
US 2012/0113934 A1 May 10, 2012

Related U.S. Application Data

(60) Provisional application No. 61/182,119, filed on May 29, 2009.

(30) Foreign Application Priority Data

May 31, 2010 (KR) .................. 10-2010-0050876

(51) Int. Cl.
*H04W 4/00* (2009.01)
*H04W 72/04* (2009.01)
(52) U.S. Cl.
USPC .......................... 370/329; 370/310

(58) Field of Classification Search
USPC .......................... 370/310, 328, 329
See application file for complete search history.

(56) References Cited

U.S. PATENT DOCUMENTS 7,809,074 B2 * 10/2010 Kotecha et al. ............... 375/267
7,852,811 B2 * 12/2010 McCoy ......................... 370/334
8,009,617 B2 * 8/2011 Sarkar et al. .................. 370/328

(Continued)

OTHER PUBLICATIONS

Taoka et al., "Optimum Reference Signal Structure for MIMO Multiplexing Using Precoding in Evolved UTRA Downlink," IEEE Military Communications Conference, Oct. 2007.
Ghosh et al., "Multi-Antenna System Design for 3GPP LTE," IEEE International Symposium on Wireless Communication System, pp. 478-482, Oct. 2008.
Parkvall et al., "LTE-Advanced—Evolving LTE towards IMT-Advanced," IEEE 68th Vehicular Technology Conference, Sep. 2008.

*Primary Examiner* — Chi Pham
*Assistant Examiner* — Robert Lopata
(74) *Attorney, Agent, or Firm* — Lee, Hong, Degerman, Kang & Waimey

(57) ABSTRACT

The present invention relates to a radio communication system and more particularly, a method and a device for efficiently transmitting precoded reference signals. The method for transmitting reference signals in multiple antenna transmission, according to one embodiment of the present invention, comprises the steps of: determining a precoding vector for each of M layers (M≥3; M is a natural number); precoding a reference signal for each of the M layers in accordance with said precoding vector; multiplexing the precoded reference signals for N layers (N<M; N is a natural number) among the precoded reference signals for the M layers using N codes; and transmitting the multiplexed precoded reference signals to a receiver.

8 Claims, 4 Drawing Sheets

(56) References Cited

U.S. PATENT DOCUMENTS

| | | | |
|---|---|---|---|
| 8,228,862 B2* | 7/2012 | Nam et al. | 370/329 |
| 8,233,559 B2* | 7/2012 | Ko et al. | 375/267 |
| 8,243,850 B2* | 8/2012 | Khan | 375/296 |
| 8,369,450 B2* | 2/2013 | Khan et al. | 375/299 |
| 2010/0046356 A1* | 2/2010 | Chun et al. | 370/208 |
| 2010/0202560 A1* | 8/2010 | Luo et al. | 375/295 |
| 2011/0134747 A1* | 6/2011 | Kwon et al. | 370/208 |
| 2011/0205930 A1* | 8/2011 | Rahman et al. | 370/252 |
| 2012/0314654 A1* | 12/2012 | Kotecha et al. | 370/328 |

\* cited by examiner

FIG. 3

$$W1 = \begin{bmatrix} a & e & i \\ b & f & j \\ c & g & k \\ d & h & l \end{bmatrix}$$

$$W2 = \begin{bmatrix} a & e & 0 \\ b & f & 0 \\ c & 0 & k \\ d & 0 & l \end{bmatrix}$$

METHOD AND DEVICE FOR EFFICIENTLY TRANSMITTING PRECODED REFERENCE SIGNAL IN RADIO COMMUNICATION SYSTEM

CROSS-REFERENCE TO RELATED APPLICATIONS

This application the National Stage filing under 35 U.S.C. 371 U.S. of International Application No. PCT/KR2010/003458, filed on May 31, 2010, which claims the benefit of earlier filing date and right of priority to Korean Application Serial No. 10-2010-0050876, filed on May 31, 2010, and also claims the benefit of U.S. Provisional Application Ser. No. 61/182,119, filed on May 29, 2009, the contents of all of which are incorporated by reference herein in their entireties.

TECHNICAL FIELD

The following description relates to a radio communication system, and more particularly, to a method and apparatus for efficiently transmitting a precoded reference signal in a radio communication system.

BACKGROUND ART

MIMO is an abbreviation for Multiple-Input Multiple-Output and refers to a method of improving data transmission/reception efficiency using multiple transmission antennas and multiple reception antennas, instead of a conventional method employing one transmission antenna and one reception antenna. In other words, MIMO technology allows a transmitter or a receiver of a wireless communication system to use multiple antennas, so that capacity or performance can be improved. Here, MIMO refers to multiple antennas.

In order to receive a message, MIMO technology is not dependent on a single antenna path. Instead, MIMO technology applies a technique of completing a whole message by gathering data fragments received via several antennas. Since MIMO technology can improve a data transmission rate in a specific range or increase system range at a specific data transmission rate, it is next-generation mobile communication technology which can be widely used in mobile communication terminals, relays, etc. Attention is being paid to this technology as a next-generation technology capable of overcoming limitations in mobile communication transmission capacity that has become a critical situation due to expansion of data communication.

FIG. 1 shows the configuration of a general MIMO communication system. As shown in FIG. 1, if the numbers of transmission and reception antennas are simultaneously increased to $N_T$ and $N_R$, respectively, a theoretical channel transmission capacity is increased in proportion to the number of antennas, unlike the case in which only either a transmitter or a receiver uses multiple antennas. Accordingly, it is possible to increase transmission rate and to remarkably improve frequency efficiency. Theoretically, the transmission rate according to an increase in channel transmission capacity can be increased by an amount obtained by multiplying an increase rate $R_i$ indicated in the following Equation 1 by a maximum transmission rate $R_o$ in case of using one antenna.

$$R_i = \min(N_T, N_R) \quad \text{[Equation 1]}$$

For example, in a MIMO communication system using four transmission antennas and four reception antennas, it is possible to theoretically obtain a transmission rate which is four times the transmission rate of a single antenna system.

After an increase in the theoretical capacity of the MIMO system was first proved in the mid-1990s, various techniques for substantially improving data transmission rate have been actively developed. Several of these techniques have already been incorporated in a variety of wireless communication standards such as the $3^{rd}$ generation mobile communication and the next-generation wireless local area network.

Active research up to now related to the MIMO technology has focused upon a number of different aspects, including research into information theory related to the computation of MIMO communication capacity in various channel environments and in multiple access environments, research into wireless channel measurement and model derivation of a MIMO system, and research into space-time signal processing technologies for improving transmission reliability and transmission rate.

A communication method of the MIMO system will be described in more detail using a mathematical model. As shown in FIG. 1, it is assumed that $N_T$ transmission antennas and $N_R$ reception antennas are present. In transmitted signals, if $N_T$ transmission antennas are present, the number of pieces of maximally transmittable information is $N_T$. The transmitted information may be expressed as vectors as indicated by the following Equation 2.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Consider that $N_T$ actually transmitted signals $x_1, x_2, \ldots, x_{N_T}$ are configured by applying a weight matrix W to the information vector $\hat{s}$ with the adjusted transmit powers. The weight matrix W serves to appropriately distribute the transmitted information to each antenna according to a transport channel state, etc. The transmitted signals $x_1, x_2, \ldots, x_{N_T}$ may be expressed by using a vector X as indicated by the following Equation 5 in which $w_{ij}$ denotes a weight between an i-th transmission antenna and j-th information. W is also called a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

If $N_R$ reception antennas are present, respective received signals $y_1, y_2, \ldots, y_{N_R}$ of the antennas are expressed as follows.

$$y = [y_1, y_2, \ldots, y_{N_R}]^T \qquad \text{[Equation 6]}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

The channels may be combined and expressed in the form of a vector and a matrix. An example of the expression of the vector will be described. FIG. 2 is a diagram showing channels from the $N_T$ transmission antennas to the reception antenna i.

As shown in FIG. 2, the channels from the $N_T$ transmission antennas to the reception antenna i may be expressed as follows.

$$h_i^T = [h_{i1}, h_{i2}, \ldots, h_{iN_T}] \qquad \text{[Equation 7]}$$

Additionally, all channels from the $N_T$ transmission antennas to the $N_R$ reception antennas through the matrix indicated by the above Equation 7 may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Additive White Gaussian Noise (AWGN) is added to the actual channels after a channel matrix H. The AWGN $n_1, n_2, \ldots, n_{N_R}$ added to the $N_R$ reception antennas may be expressed as follows.

$$n = [n_1, n_2, \ldots, n_{N_R}]^T \qquad \text{[Equation 9]}$$

Through the above-described mathematical equations, the received signals may be expressed as follows.

$$y = \begin{bmatrix} y_1 \\ y_2 \\ \vdots \\ y_i \\ \vdots \\ y_{N_R} \end{bmatrix} \qquad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H may be expressed by an $N_R \times N_T$ matrix. Generally, the rank of the matrix is defined by the smaller of the number of rows or the number of columns, which are independent of each other. Accordingly, the rank of the matrix is not greater than the number of rows or columns. The rank of the channel matrix H is expressed as follows.

$$\text{rank}(H) \leq \min(N_T, N_R) \qquad \text{[Equation 11]}$$

In a MIMO system, precoding provides beamforming gain and diversity gain to a transmitter and a receiver, thereby offering high system throughput. However, a precoding scheme should be appropriately designed in consideration of antenna configuration, channel environments, system architecture, etc.

Generally, a MIMO system performing precoding in order to minimize complexity and control signaling overhead uses a codebook based precoding scheme. The codebook includes a predetermined number of precoding vectors/matrices which is determined between the transmitter and the receiver according to a transmission rank and the number of antennas. The transmitter performs precoding upon a signal to be transmitted by selecting a specific precoding vector/matrix within the codebook according to channel state information received from the receiver. In some cases, the transmitter may perform precoding by selecting a precoding matrix according to a predetermined rule without receiving the channel state information from the receiver and may transmit the precoded signal.

A channel estimation method in a MIMO transmission system using precoded spatial multiplexing will now be described. For channel estimation, a Reference Signal (RS) is provided. If a non-precoded RS is used, each channel from transmission antenna ports is estimated from the RS and an equivalent channel can be obtained by a combination of an estimated channel matrix and a precoding weight. Meanwhile, if a precoded RS is used, since the precoded RS has been precoded by the same precoding weight as in data transmission, an equivalent channel can be directly obtained from the precoded RS. An equivalent channel matrix is composed of channel vectors experienced by each layer and each channel vector can be estimated by a Frequency Division Multiplexing (FDM), Time Division Multiplexing (TDM), or Code Division Multiplexing (CDM) scheme.

In a MIMO transmission scheme of rank-2 or more, precoded RSs for two or more layers may be transmitted through one resource element (time and frequency resources) by performing multiplexing using a CDM scheme. In this case, CDM resources corresponding to the number of transmission ranks (or number of transmission layers) are needed. That is, for rank-2 transmission, two CDM resources are needed, and for rank-3 transmission, three CDM resources are needed.

When more CDM resources are used as rank increases, transfer overhead of control information for indicating the resources increases. For example, a DeModulation Reference Signal (DMRS) for uplink transmission can be multiplexed by using a Cyclic Shift (CS) as CDM resources and the CS value for the DMRS is indicated to a User Equipment (UE) through a Downlink Control Information (DCI) format. If the CS values which should be indicated to the UE differ according to rank, various DCI formats need to be defined and the UE may bear an increased burden of blind-decoding the DCI format.

DETAILED DESCRIPTION OF THE INVENTION

Technical Problems

A method is needed for efficiently transmitting precoded RSs without increasing CDM resource for transmitting the precoded RSs even if transmission rank is increased.

Technical Solution

To solve the above problem, a method for transmitting reference signals in a multiple-antenna transmission in accordance with an embodiment of the present invention includes determining a precoding vector for each of M layers (where M≥3, M being a natural number), precoding a reference signal for each of the M layers according to the precoding vector, multiplexing precoded reference signals for N layers (where N<M, N being a natural number) among precoded reference signals for the M layers using N codes, and transmitting the multiplexed precoded reference signals to a receiver.

The multiplexing of the precoded reference signals may further include multiplexing the precoded reference signal for each of the M layers at least once.

The transmission of the multiplexed precoded reference signals may further include setting a transmission power of a precoded reference signal for a layer transmitted a greater number of times than precoded reference signals for the other layers to be lower than transmission powers of the precoded reference signals for the other layers.

The multiplexing of the precoded reference signals may further include multiplexing precoded reference signals for layers which include an element of a value of 0 in the precoding vector with precoded reference signals for layers which do not include an element of a value of 0 in the precoding vector.

M may be 3 and N may be 2.

To solve the above problem, an apparatus for transmitting reference signals in multiple-antenna transmission in accordance with another embodiment of the present invention includes a layer mapping module for mapping a signal to be transmitted to a layer, a precoding module for precoding the mapped signal according to a precoding vector, a resource element mapping module for multiplexing the precoded signal and mapping the multiplexed precoded signal to a resource element, a transmission module for transmitting the mapped signal through multiple antennas, and a processor connected to be able to communicate with the layer mapping module, the precoding module, the resource element mapping module, and the transmission module, wherein the processor controls the precoding module to determine a precoding vector for each of M layers (where M≥3, M being a natural number) through and to precode a reference signal for each of the M layers according to the determined, controls the resource element mapping module to multiplex precoded reference signals for N layers (where N<M, N being a natural number) among precoded reference signals for the M layers using N codes, and controls the transmission module to transmit the multiplexed precoded reference signals to a receiver.

The processor may control the resource element mapping module to multiplex the precoded reference signal for each of the M layers at least once.

The processor may control the transmission module to set a transmission power of a precoded reference signal for a layer transmitted a greater number of times than precoded reference signals for the other layers to be lower than transmission powers of the precoded reference signals for the other layers.

The processor may control the resource element mapping module to multiplex precoded reference signals for layers which include an element of a value of 0 in the precoding vector with precoded reference signals for layers which do not include an element of a value of 0 in the precoding vector.

M may be 3 and N may be 2.

Advantageous Effects

According to the present invention, a method and apparatus for efficiently transmitting precoded RSs without increasing CDM resource for transmitting the precoded RSs can be provided even if transmission rank is increased.

The effects which can be obtained from the present invention are not limited to the above-mentioned effects, and other effects not mentioned above can be clearly understood by one skilled in the art from the following description of the embodiments of the present invention.

BRIEF DESCRIPTION OF THE DRAWINGS

FIG. 3 is a diagram showing an example of a precoding matrix according to the present invention.

BEST MODE FOR CARRYING OUT THE INVENTION

Figure 1:
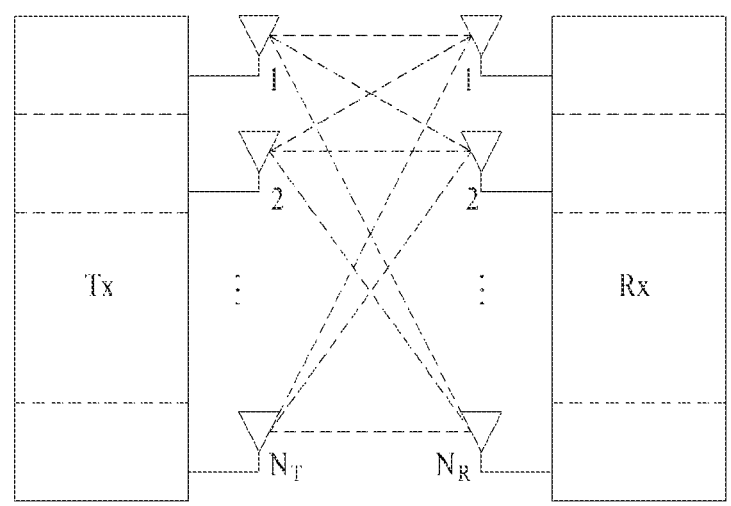
FIG. 1 shows the configuration of a general MIMO communication system.
Figure 2:
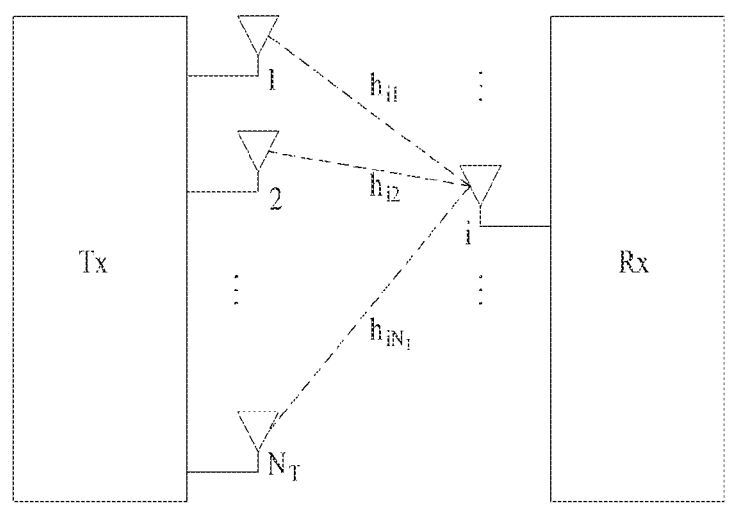
FIG. 2 is a diagram showing channels from a plurality of transmission antennas to a reception antenna.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In exemplary embodiments of the present invention, a description is made of a data transmission and reception relationship between a base station and a terminal. Here, the base station refers to a terminal node of a network communicating directly with the terminal. In some cases, a specific operation described as being performed by the base station may be performed by an upper node of the base station.

In other words, it is apparent that, in a network comprised of a plurality of network nodes including a base station, various operations performed for communication with a terminal may be performed by the base station, or network nodes other than the base station. The term 'base station' may be replaced with terms such as fixed station, Node B, eNode B (eNB), and Access Point (AP). The term 'relay' may be replaced with terms such as Relay Node (RN) and Relay Station (RS). Also, the term 'terminal' may be replaced with terms such as User Equipment (UE), Mobile Station (MS), Mobile Subscriber Station (MSS), and Subscriber Station (SS).

Specific terms disclosed in the present invention are proposed to aid in understanding the present invention, and the use of these specific terms may be changed to another format within the technical scope or spirit of the present invention.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

Exemplary embodiments of the present invention are supported by standard documents disclosed in at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be used for a variety of wireless access systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the Universal Mobile Telecommunications System (UMTS). 3rd Generation Partnership Project (3GPP) Long Term Evolution (LTE) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A systems. However, technical features of the present invention are not limited thereto.

In the following description, 'rank' refers to the number of paths which can independently transmit signals and 'number of layers' refers to the number of signal streams transmitted through each path. Generally, since a transmitter transmits layers of a number corresponding to the number of ranks used for signal transmission, rank has the same meaning as the number of layers, unless otherwise mentioned. Also, it is assumed in a precoding matrix that a row corresponds to each antenna and a column corresponds to a rank or each layer signal.

A 3GPP LTE release-8 system specifies a MIMO transmission scheme only for downlink signal transmission from a BS to a UE due to Peak-to-Average Power Ratio (PAPR)/Cubic Metric (CM) characteristic degradation when a MIMO scheme is applied to uplink signal transmission from the UE to the BS. However, the trend of applying the MIMO scheme for uplink signal transmission from the UE to the BS is being discussed in order to increase transmission rate and to obtain diversity gain and a substantial method for applying the MIMO scheme to uplink signal transmission is being discussed in a 3GPP LTE-A system subsequent to the 3GPP LTE system.

If a precoded RS is transmitted via an uplink MIMO transmission scheme, it is necessary to consider compatibility with the legacy 3GPP LTE system. That is, a DMRS for uplink multiple-antenna transmission of the 3GPP LTE-A system needs to be designed in consideration of a DMRS which has been used in the legacy 3GPP LTE system.

A DMRS defined in the legacy 3GPp LTE standard (release-8 or 9) will now be described.

A DMRS is defined in a Physical Uplink Shared Channel (PDSCH) for uplink data transmission. For each UE, a DMRS is transmitted over a bandwidth to which the PUSCH of the UE is scheduled. In a MIMO system, the DMRS for the PUSCH is multiplexed as follows. In the case of single-input multiple-output transmission, different frequency resources are used for UEs, so that the DMRSs of respective UEs may be multiplexed by an FDM scheme. In the case of Multiple User (MU)-MIMO transmission, different CS values are allocated to respective UEs, so that the DMRSs of the respective UEs may be orthogonalized and transmitted. Different CS values may be used in different slots of a subframe. In a normal Cyclic Prefix (CP) case, the DMRS for the PUSCH is located on the fourth OFDM symbol, and in an extended CP case, the DMRS for the PUSCH is located on the third OFDM symbol. A CS in a slot $n_s$ is given by Equation 12.

$$n_{cs}=(n_{DMRS}^{(1)}+n_{DMRS}^{(2)}+n_{PRS}(n_s)) \bmod 12 \qquad \text{[Equation 12]}$$

where $n_{DMRS}^{(1)}$ denotes a value broadcast by an upper layer and $n_{DMRS}^{(2)}$ is included in an uplink grant for MU-MIMO. $n_{PRS}$ is given by a pseudo-random sequence c(i) and c(i) is cell-specifically applied. The mapping relationship between a CS field of the uplink grant and $n_{DMRS}^{(2)}$ is shown in Table 1.

TABLE 1

| CS field of uplink grant | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

In designing a DMRS for uplink multiple-antenna transmission of the 3GPP LTE-A system considering an uplink DMRS which has been used in the above-described legacy 3GPP LTE system, compatibility with the legacy 3GPP LTE system can be maintained by multiplexing the DMRS for multiple antennas by a CDM scheme before transmission. To transmit a precoded RS by the CDM scheme, CDM resources corresponding to the number of transmission ranks (or the number of transmission layers) are needed. Further, since a CS is used as a CDM resource for uplink in the legacy 3GPP LTE system, CS resources corresponding to the number of transmission ranks should be allocated.

Data allocation for uplink transmission and a CS value of a DMRS are indicated to a UE through a DCI format including control information for uplink transmission. If the numbers of CS values which should be indicated differ according to rank, it is necessary to define a variety of DCI formats. Then, the number of blind decoding attempts performed by the UE to obtain uplink transmission control information is increased. To eliminate such inefficiency, the DCI formats for uplink transmission should include a fixed bit field irrespective of the number of transmission ranks. To this end, the CS needs to be composed of fixed bits.

In an embodiment of the present invention, a method for transmitting RSs using CDM resources less than the number of ranks in transmission of rank-3 or more is proposed. For example, in rank-M transmission, a method for transmitting RSs using N CDM resources (where N<M) is described. The number of CDM resources, N, may have a fixed value even if the rank M is increased.

Among three layers constituting rank-3 transmission, precoded RSs for two arbitrary layers are multiplexed using two code resources and transmitted on one equal resource element A (one resource element is a unit corresponding to one OFDM symbol in a time axis and one subcarrier in a frequency axis). Moreover, precoded RSs for two arbitrary layers are multiplexed using two code resources and transmitted on another resource element B (resource element B may different from the resource element A in time and/or frequency location). In more detail, in transmitting precoded RSs for M layers in rank-M transmission (where M=3), the precoded RSs may be multiplexed using N CDM resources (where N=2<M). Accordingly, it is possible to transmit precoded RSs for multiple layers by efficiently using CDM resources.

In this case, the code resources used for CDM on the resource element A are the same as the code resources used for CDM on the resource element B. A layer for which a precoded RS is multiplexed by a CDM scheme on the resource element A may be the same layer as a layer for which a precoded RS is multiplexed by a CDM scheme on the resource element B.

Within a resource block and a subframe allocated for RS transmission, it is necessary to transmit precoded RSs for all three layers at least once. To this end, two or more time and/or frequency resources are used.

According to the above-described method, a precoded RS for any layer among the three layers may be transmitted a greater number of times than a precoded RS for another layer. Then the precoded RS for the layer transmitted relatively the greater number of times may be transmitted at a relatively lower power than the precoded RS for another layer during one-time transmission.

For example, a 4×3 precoding matrix indicating a precoding weight for 3 layers (columns) in 4 antenna ports (rows) may be considered. In a 4×3 precoding matrix W1 shown in FIG. 3, for first transmission, a CDM resource is precoded using precoding vectors for first and second layers and then is transmitted. For second transmission, a CDM resource is precoded using precoding vectors for second and third layers and then is transmitted. That is, in the first transmission, RSs for the first and second layers may be precoded using the precoding vectors for the first and second layers (columns), and the precoded RSs may be multiplexed using CDM resources and then may be transmitted on a first resource element. In the second transmission, RSs for the second and third layers may be precoded using the precoding vectors for the second and third layers (columns), and the precoded RSs may be multiplexed using CDM resources and then may be transmitted on a second resource element.

In this case, a transmission power may be adjusted. The precoded RS for the second layer which is used for both the first and second transmission may be transmitted at a power of 'a' and the precoded RSs for the first and third layers, each of which is transmitted once in the first and second transmission, may be transmitted at a power of '2a'.

In a precoding matrix including an element of a value 0 in any layer (column) as shown in a precoding matrix W2 in FIG. 3, a precoded RS for a first layer is transmitted through all of four antenna ports, whereas precoded RSs for second and third layers are transmitted through only two antenna ports (the precoded RS for the second layer is transmitted only through first and second antenna ports and the precoded RS for the third layer is transmitted only through third and fourth antenna ports). When using a precoding matrix including an element of a value 0 as in the precoding matrix W2, if the precoded RSs for the first and second layers are multiplexed and transmitted in first transmission and the precoded RSs for the second and third layers are multiplexed and transmitted in second transmission, circumstances occurs in which transmission powers for antenna ports (rows corresponding to elements of a value 0 in the precoding matrix) which are not transmitted for the second and third layers during signal transmission are lowered. To maintain the transmission powers of the antenna ports, precoded RSs for the first and second layers may be multiplexed and transmitted on a first resource element and precoded RSs for the first and third layers may be multiplexed and transmitted on a second resource element. Then, since the precoded RS (for the first layer) is transmitted to all of the first to fourth antenna ports in both the first and second transmission, a situation in which the transmission powers of antenna ports should be abruptly lowered can be avoided.

For example, DMRSs for a physical uplink shared channel are transmitted on two SC-FDMA symbols (hereinafter, referred to as first and second DMRS transmission SC-FDMA symbols) of one subframe. According to the embodiment of the present invention, precoded DMRSs for first and second layers may be multiplexed by a CDM scheme and transmitted on the first DMRS transmission SC-FDMA symbol and precoded DMRSs for first and third layers may be multiplexed by a CDM scheme and transmitted on the second DMRS transmission SC-FDMA symbol. Then, since the precoded DMRS for the first layer are transmitted through all four transmission antenna ports on both the first and second DMRS transmission SC-FDMA symbols, a situation in which powers of transmission antennas should be lowered during signal transmission according to precoding vectors for the second and third layers including elements of a value 0 does not occur.

The above-described embodiment of the present invention has described the case of rank-3 transmission. However, the embodiment of the present invention may be applied to the case of rank-4 or more. That is, RSs for two arbitrary layers among precoded RSs for four layers constituting rank-4 transmission may be multiplexed using two CDM resources and may then be transmitted and RSs for another two layers may be multiplexed using two CDM resources and may be transmitted.

Although the above-described embodiment of the present invention has described an example of precoded RS transmission in uplink, it is apparent to those skilled in the art that the embodiment of the present invention may be applied to precoded RS transmission for each layer in downlink of rank-3 or more. Also, the effects of the present invention for efficiently using CDM resources by transmitting precoded RSs using less CDM resources than the number of ranks in transmission of rank-3 or more is identically achieved in uplink and downlink precoded RS transmission.

Figure 4:
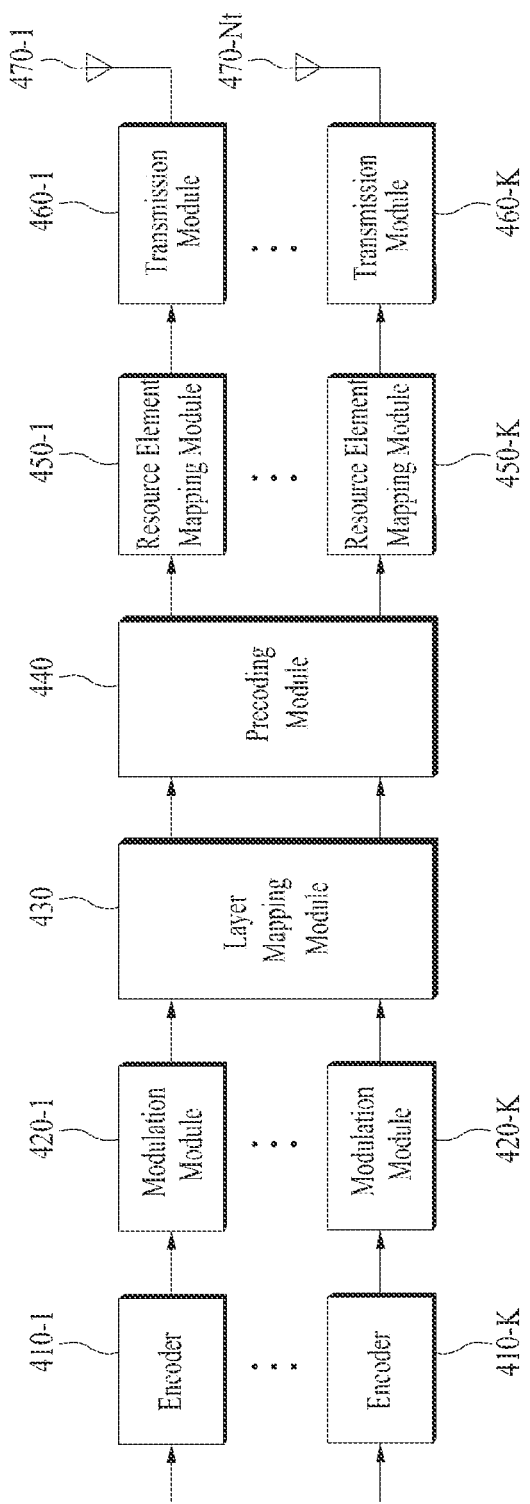
FIG. 4 is a diagram showing the configuration of a transmission apparatus according to an embodiment of the present invention.

FIG. 4 is a diagram showing the configuration of a transmission apparatus including multiple antennas according to an embodiment of the present invention.

Referring to FIG. 4, the transmission apparatus includes encoders 410-1, . . . , 410-K, modulation modules 420-1, . . . , 420-K, a layer mapping module 430, a precoding module 440, resource element mapping modules 450-1, . . . , 450-K, transmission modules 460-1, . . . , 460-K, and Nt transmission antennas 470-1, . . . , 470-Nt.

The encoders 410-1, . . . , 410-K form coded data by encoding input data according to a predetermined coding scheme. The modulation modules 420-1, . . . , 420-K map the coded data to modulation symbols indicating locations on a signal constellation. There is no restriction as to a modulation scheme and m-Phase Shift Keying (m-PSK) or m-Quadrature Amplitude Modulation (m-QAM) may be used as the modulation scheme. The m-PSK may be BPSK, QPSK, or 8-PSK for example. The m-QAM may be 16-QAM, 64-QAM, or 256-QAM.

The layer mapping module 430 defines the layers of the modulation symbols so that the precoding module 440 can distribute antenna-specific symbols to paths of the respective antennas. A layer is defined as an information path input to the precoding module 440. An information path prior to the precoding module 440 may be called a virtual antenna or layer.

The precoding module 440 processes the modulation symbols by a MIMO scheme according to the multiple transmission antennas 470-1, . . . , 470-Nt and outputs the antenna-specific symbols. The precoding module 440 distributes the antenna-specific symbols to the resource element mapping modules 450-1, . . . , 450-K of corresponding antenna paths. Each information path transmitted to one antenna by the precoding module 440 is called a stream. The stream may also be called a physical antenna.

The resource element mapping modules 450-1, . . . , 450-K allocate the antenna-specific symbols to proper resource elements and multiplex the antenna-specific symbols according to users. The transmission modules 460-1, . . . , 460-K modulate the antenna-specific symbols according to a predetermined multiplexing scheme. In the case of transmission modules of a BS transmitting a downlink signal, the transmission modules 460-1, . . . , 460-K modulate the antenna-specific symbols by an OFDM scheme and generate OFDM symbols. In the case of transmission modules of a BS transmitting an uplink signal, the transmission modules 460-1, . . . , 460-K modulate the antenna-specific symbols using an SC-FDMA scheme and generate SC-FDMA symbols. In downlink, the transmission modules 460-1, . . . , 460-K may perform Inverse Fast Fourier Transform (IFFT) upon the antenna-specific symbols. A CP may be inserted into a time domain symbol upon which IFFT has been performed. The CP is a signal inserted to a guard interval in order to eliminate inter-symbol interference caused by multiple paths in an OFDM transmission scheme. The OFDM symbols are transmitted through the respective transmission antennas 470-1, . . . , 470-Nt.

In the apparatus for transmitting RSs in multiple-antenna transmission according to one embodiment of the present invention, the precoding module 440 precodes RSs according to precoding vectors for M layers (where M being a natural number) received from the layer mapping module 430 and generates the precoded RSs.

The resource element mapping module 450 multiplexes the precoded RSs using a CDM scheme and maps the multiplexed RSs to resource elements. More specifically, the resource element mapping module 450 multiplexes precoded RSs for N layers (where N<M, N being a natural number) among the precoded RSs for the M layers by use of N codes. A plurality of multiplexing operations is performed so that all of the RSs of the M layers can be multiplexed at least once. For example, if M is 3 and N is 2, three combinations may be present such as first and second layers, first and third layers, and second and third layers and precoded RSs for the corresponding layers according to at least two of the three combinations may be multiplexed by a CDM scheme. When selecting such combinations, it may be assumed that precoding vectors for the second and third layers include an element having a value of 0 and a precoding vector for the first layer does not include an element having a value of 0. Then an RS of the layer corresponding to the precoding vector which does not include an element having a value of 0 may be multiplexed with an RS of another layer. That is, precoded RSs for the first and third layers may be multiplexed and precoded RSs for the first and third layers may be multiplexed.

The transmission module 460 may map the multiplexed precoded RSs to resource elements and may transmit the mapped RSs to a receiver. If a transmitted number of times of a precoded RS for any layer is greater than that of a precoded RS for another layer, a transmission power of the precoded RS for any layer may be set to be lower than that of the precoded RS for another layer. For example, it is assumed when M is 3 that precoded RSs for first and second layers are multiplexed and transmitted and precoded RSs for first and third layers are multiplexed and transmitted. Then the precoded RS for the first layer is transmitted twice and the precoded RSs for the second and third layers are transmitted once. Therefore, the transmission power of the precoded RS for the first layer may be set to 'a' and the transmission powers of the precoded RSs for the second and third layers may be set to '2a'.

Meanwhile, the transmission apparatus may further include a processor, which controls the constituent modules of the transmission apparatus and performs an operation processing function upon information received by the transmission apparatus and information to be externally transmitted, and a memory which can store operation-processed information for a predetermined time period.

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via a variety of well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

The invention claimed is:

1. A method for transmitting reference signals in multiple-antenna transmission, the method comprising:
    determining a precoding vector for each of M layers, wherein M is a natural number greater than or equal to 3;
    precoding a reference signal for each of the M layers according to the corresponding determined precoding vector;
    multiplexing precoded reference signals for N layers among precoded reference signals for the M layers using N codes, wherein N is a natural number greater than or equal to 2 and less than M; and
    transmitting the multiplexed precoded reference signals to a receiver,
    wherein multiplexing the precoded reference signals comprises multiplexing the precoded reference signal for each of the M layers at least once.

2. The method of claim 1, wherein transmitting the multiplexed precoded reference signals comprises setting a transmission power of a precoded reference signal for a layer that is transmitted a greater number of times than precoded reference signals for other layers such that the set transmission power is lower than transmission powers set for the precoded reference signals for the other layers.

3. The method of claim 1, wherein multiplexing the precoded reference signals comprises multiplexing precoded reference signals for layers that include an element having a value of 0 in the corresponding precoding vector with precoded reference signals for layers which do not include an element having a value of 0 in the corresponding precoding vector.

4. The method of claim 1, wherein M is 3 and N is 2.

5. An apparatus for transmitting reference signals in multiple-antenna transmission, the apparatus comprising:
    a layer mapping module for mapping a signal for transmission to a layer;
    a precoding module for precoding the mapped signal according to a precoding vector;
    a resource element mapping module for multiplexing the precoded signal and mapping the multiplexed precoded signal to a resource element;
    a transmission module for transmitting the mapped signal through multiple antennas; and
    a processor for communicating with the layer mapping module, the precoding module, the resource element mapping module, and the transmission module,
    wherein the processor is further for:
    controlling the precoding module to determine a precoding vector for each of M layers; wherein M is a natural greater than or equal to 3;
    precoding a reference signal for each of the M layers according to the corresponding determined precoding vector;
    controlling the resource element mapping module to multiplex precoded reference signals for N layers among precoded reference signals for the M layers using N, codes, wherein N is a natural number greater than or equal to 2 and less than M;
    controlling the transmission module to transmit the multiplexed precoded reference signals to a receiver; and
    controlling the resource element mapping module to multiplex the precoded reference signal for each of the M layers at least once.

6. The apparatus of claim 5, wherein the processor is further for controlling the transmission module to set a transmission power of a precoded reference signal for a layer that is transmitted a greater number of times than precoded reference signals for other layers such that the set transmission power is lower than transmission powers set for the precoded reference signals for the other layers.

7. The apparatus of claim 5, wherein the processor is further for controlling the resource element mapping module to multiplex precoded reference signals for layers that include an element having a value of 0 in the corresponding precoding vector with precoded reference signals for layers which do not include an element having a value of 0 in the corresponding precoding vector.

8. The apparatus of claim 5, wherein M is 3 and N is 2.

* * * * *